US008818690B2

(12) United States Patent
Tani et al.

(10) Patent No.: US 8,818,690 B2
(45) Date of Patent: Aug. 26, 2014

(54) AIR-FUEL RATIO CONTROL APPARATUS FOR INTERNAL COMBUSTION ENGINE

(75) Inventors: Michinori Tani, Wako (JP); Kenichi Maeda, Wako (JP); Atsuhiro Miyauchi, Wako (JP); Seiji Watanabe, Wako (JP); Soichiro Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 645 days.

(21) Appl. No.: 13/174,653

(22) Filed: Jun. 30, 2011

(65) Prior Publication Data

US 2012/0004827 A1 Jan. 5, 2012

(30) Foreign Application Priority Data

Jul. 2, 2010 (JP) ................................. 2010-151597

(51) Int. Cl.
*F02D 41/14* (2006.01)
*F02D 28/00* (2006.01)
*G06F 17/00* (2006.01)

(52) U.S. Cl.
USPC ............................ 701/103; 604/274; 123/679

(58) Field of Classification Search
USPC .......... 701/103, 102, 108, 109; 123/672, 674, 123/679, 688, 693, 696; 60/274, 277, 285
See application file for complete search history.

(56) References Cited

U.S. PATENT DOCUMENTS 6,684,150 B2 * 1/2004 Yasui et al. .................. 701/106
6,925,372 B2 * 8/2005 Yasui ............................ 701/103
7,032,374 B2 * 4/2006 Okazaki et al. ............... 701/103

FOREIGN PATENT DOCUMENTS

JP 9-317531 12/1997

* cited by examiner

*Primary Examiner* — Hieu T Vo
(74) *Attorney, Agent, or Firm* — Mori & Ward, LLP

(57) ABSTRACT

An air-fuel ratio control apparatus for an internal combustion engine includes an air-fuel ratio sensor having an output characteristic which is nonlinear with respect to the air-fuel ratio of exhaust gas. An output deviation converter is configured to convert an output deviation to a first predetermined value if an output value of the air-fuel ratio sensor is on a richer side of a predetermined target value and to a second predetermined value if the output value is on a leaner side of the target value. A control input calculator is configured to calculate a control input to feedback-control the output value of the air-fuel ratio sensor such that the output deviation converted by the output deviation converter is to be zero. An air-fuel ratio controller is configured to control the air-fuel ratio of exhaust gas using the control input calculated by the control input calculator.

9 Claims, 7 Drawing Sheets

AIR-FUEL RATIO CONTROL APPARATUS FOR INTERNAL COMBUSTION ENGINE

CROSS-REFERENCE TO RELATED APPLICATIONS

The present application claims priority under 35 U.S.C. §119 to Japanese Patent Application No. 2010-151597, filed Jul. 2, 2010, entitled "Air-Fuel Ratio Control Apparatus for Internal Combustion Engine". The contents of this application are incorporated herein by reference in their entirety.

BACKGROUND OF THE INVENTION

1. Field of the Invention

The present invention relates to an air-fuel ratio control apparatus for an internal combustion engine.

2. Description of the Related Art

An example of such an air-fuel ratio control apparatus for an internal combustion engine is disclosed in Japanese Unexamined Patent Application Publication No. 9-317531. An exhaust path of the internal combustion engine is provided with a catalyst for cleaning up exhaust gas. A linear air-fuel (LAF) sensor and an oxygen concentration sensor are provided upstream and downstream, respectively, of the catalyst. The LAF sensor linearly detects an air-fuel ratio of exhaust gas (hereinafter may be referred to as an exhaust gas air-fuel ratio). The oxygen concentration sensor detects an exhaust gas air-fuel ratio, and is of so-called inversion type having an output characteristic that changes dramatically around an exhaust gas air-fuel ratio corresponding to a theoretical air-fuel ratio.

This air-fuel ratio control apparatus feedback-controls a fuel injection quantity such that the exhaust gas air-fuel ratio detected by the LAF sensor is equal to a target air-fuel ratio. Also, the air-fuel ratio control apparatus calculates the amount of correction for correcting the fuel injection quantity in accordance with the exhaust gas air-fuel ratio detected by the oxygen concentration sensor. Specifically, a range of output values of the oxygen concentration sensor is divided into four regions by a target value corresponding to the target air-fuel ratio, and two values, one corresponding to a predetermined rich reference air-fuel ratio richer than the target air-fuel ratio and the other to a predetermined lean reference air-fuel ratio leaner than the target air-fuel ratio. Then, if the output value of the oxygen concentration sensor is in one of the two regions closer to the target value, the amount of correction is set to a smaller value, and if the output value of the oxygen concentration sensor is in one of the two regions farther from the target value, the amount of correction is set to a larger value. Thus, a larger amount of correction is used for regions where an output deviation representing a difference between the target value and the output value of the oxygen concentration sensor is large, and thereby the exhaust gas air-fuel ratio is quickly adjusted to the target air-fuel ratio.

SUMMARY OF THE INVENTION

According to one aspect of the present invention, an air-fuel ratio control apparatus for an internal combustion engine includes an air-fuel ratio sensor, an output deviation converter, a control input calculator, and an air-fuel ratio controller. The air-fuel ratio sensor is disposed in an exhaust path of the internal combustion engine and is configured to detect an air-fuel ratio of exhaust gas. The air-fuel ratio sensor has an output characteristic which is nonlinear with respect to the air-fuel ratio of exhaust gas. The output deviation converter is configured to convert an output deviation to a first predetermined value if an output value of the air-fuel ratio sensor is on a richer side of a predetermined target value and to a second predetermined value if the output value is on a leaner side of the target value. The output deviation is a difference between the output value and the target value. The first and second predetermined values have a same absolute value and opposite signs. The control input calculator is configured to calculate a control input to feedback-control the output value of the air-fuel ratio sensor such that the output deviation converted by the output deviation converter is to be zero. The air-fuel ratio controller is configured to control the air-fuel ratio of exhaust gas using the control input calculated by the control input calculator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
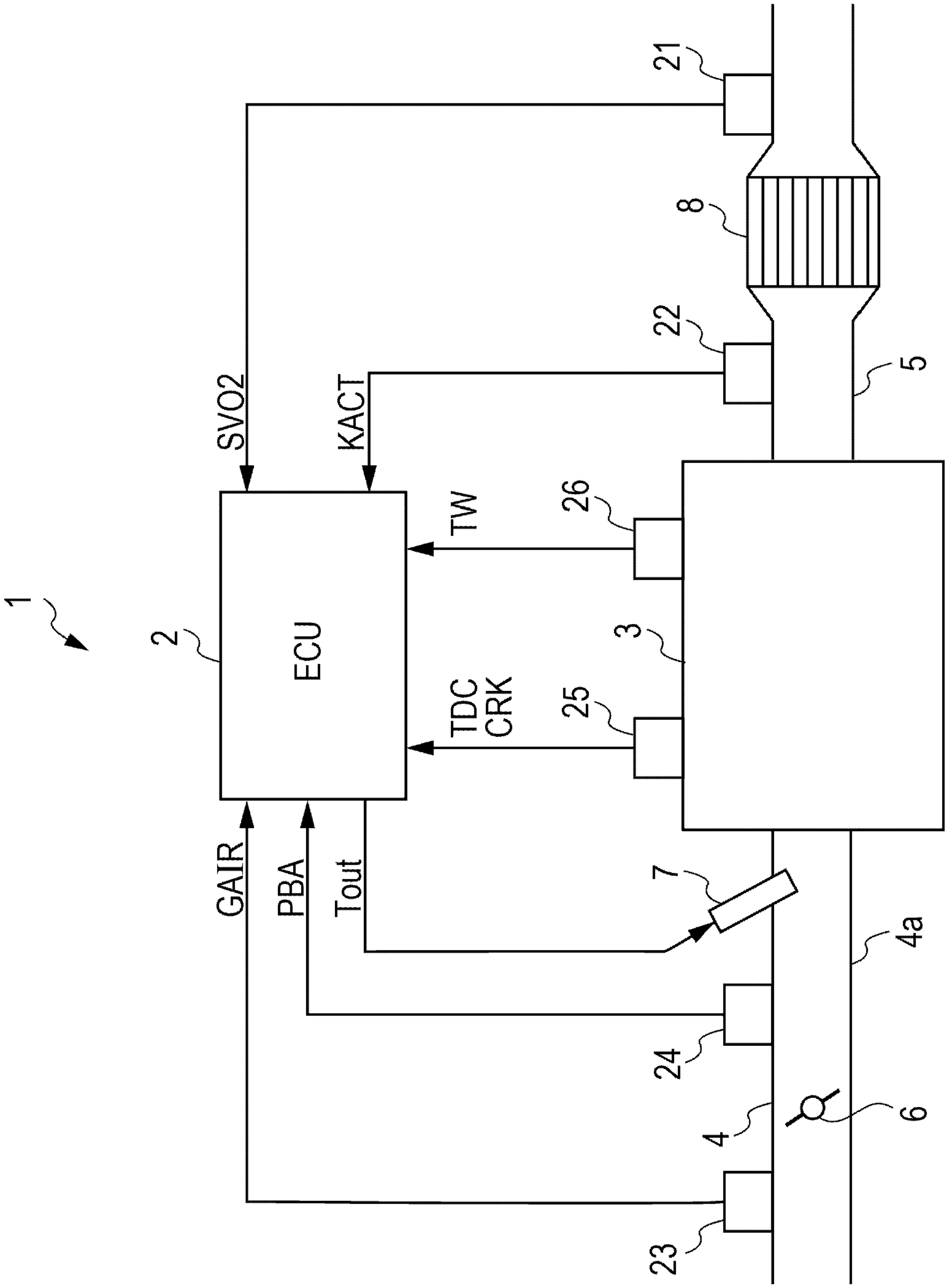
FIG. 1 illustrates an air-fuel ratio control apparatus according to an embodiment of the present invention, along with an internal combustion engine.

The embodiments of the present invention will now be described with reference to the drawings, wherein like reference numerals designate corresponding or identical elements throughout the various drawings. As illustrated in FIG. 1, an air-fuel ratio control apparatus 1 to which the embodiment of the present invention is applied includes an electronic control unit (ECU) 2. The ECU 2 performs various control processes, including air-fuel ratio control of an internal combustion engine (hereinafter referred to as "engine") 3. The engine 3 is, for example, a four-cylinder gasoline engine mounted on a vehicle (not shown). An intake pipe 4 of the engine 3 is provided with a throttle valve 6. An intake manifold 4*a* downstream of the throttle valve 6 is provided with a fuel injection valve (hereinafter referred to as "injector") 7. A valve opening duration and opening/closing timing of the injector 7 are controlled by the ECU 2. Thus, a fuel injection quantity Tout and fuel injection timing are controlled.

A catalyst 8 is provided downstream of an exhaust pipe 5. The catalyst 8 is a three-way catalyst. CO, HC, and NOx in exhaust gas are removed by an oxidation-reduction action of the catalyst 8.

The exhaust pipe 5 is provided with an oxygen concentration sensor (hereinafter referred to as "$O_2$ sensor") 21 downstream of the catalyst 8. The $O_2$ sensor 21 detects concentration of oxygen in exhaust gas at a position downstream of the catalyst 8. Then, the $O_2$ sensor 21 outputs, to the ECU 2, a signal having a voltage corresponding to the detected oxygen concentration.

Figure 2:
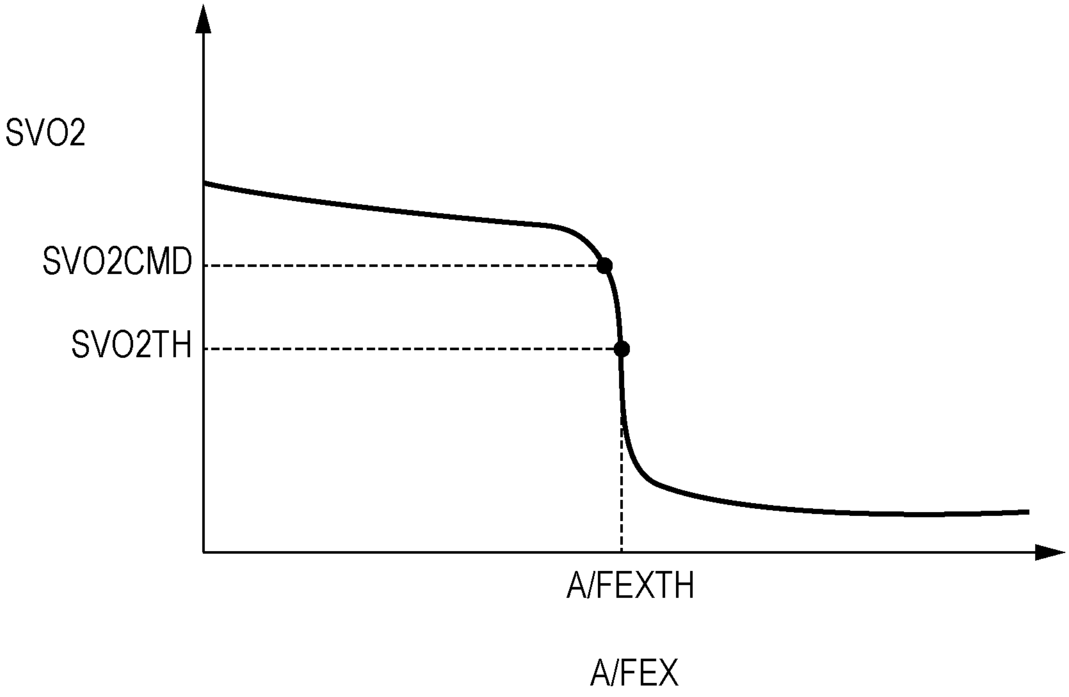
FIG. 2 is a graph showing an output characteristic of an oxygen concentration sensor.

As illustrated in FIG. 2, the $O_2$ sensor 21 has an output characteristic that changes dramatically around an exhaust gas air-fuel ratio corresponding to a theoretical air-fuel ratio of an air-fuel mixture (hereinafter referred to as "theoretical exhaust gas air-fuel ratio") A/FEXTH. Specifically, a voltage value of an output signal of the $O_2$ sensor 21 (hereinafter referred to as "$O_2$ output value") SVO2 is high (e.g., 600 mV or higher) if an air-fuel mixture richer than a theoretical air-fuel ratio is burned and an exhaust gas air-fuel ratio A/FEX is rich, but is low (e.g., 200 mV or lower) if an air-fuel mixture leaner than the theoretical air-fuel ratio is burned and the exhaust gas air-fuel ratio A/FEX is lean. The $O_2$ output value SVO2 changes dramatically between the high and low values described above if an air-fuel mixture having an air-fuel ratio close to the theoretical air-fuel ratio is burned and the exhaust gas air-fuel ratio A/FEX is close to the theoretical exhaust gas air-fuel ratio A/FEXTH.

The exhaust pipe 5 is also provided with an LAF sensor 22 upstream of the catalyst 8. The LAF sensor 22 linearly detects concentration of oxygen in exhaust gas over a wide range of values, from rich to lean with respect to the theoretical exhaust gas air-fuel ratio A/FEXTH. The LAF sensor 22 outputs a detection signal representing an exhaust gas air-fuel ratio corresponding to the detected oxygen concentration (hereinafter referred to as "actual air-fuel ratio") KACT to the ECU 2. The actual air-fuel ratio KACT and a target air-fuel ratio KCMD (described below) are expressed in equivalent ratios.

The intake pipe 4 is provided with an airflow meter 23 and an intake pressure sensor 24 upstream and downstream, respectively, of the throttle valve 6. The airflow meter 23 detects the mass of air that flows through the intake pipe 4 (hereinafter referred to as "air mass") GAIR. The intake pressure sensor 24 detects the pressure of intake air (hereinafter referred to as "intake pressure") PBA. The airflow meter 23 and the intake pressure sensor 24 output the corresponding detection signals to the ECU 2. Additionally, a water temperature sensor 26 outputs a detection signal representing the temperature of cooling water for the engine 3 (hereinafter referred to as "engine water temperature") TW to the ECU 2.

A crankshaft (not shown) of the engine 3 is provided with a crank angle sensor 25. As the crankshaft rotates, the crank angle sensor 25 outputs pulse signals, a CRK signal and a TDC signal, to the ECU 2.

The CRK signal is output at every predetermined crank angle (e.g., 30°). In accordance with the CRK signal, the ECU 2 calculates the number of revolutions of the engine 3 (hereinafter referred to as "engine speed") NE. The TDC signal is a signal indicating that a piston of any cylinder (not shown) is located at a predetermined crank-angle position in the vicinity of the top dead center (TDC) at the beginning of an intake stroke. In the four-cylinder engine of the present embodiment, the TDC signal is output at every crank angle of 180°.

The ECU 2 is constituted by a microcomputer (not shown) which includes a central processing unit (CPU), a random-access memory (RAM), a read-only memory (ROM), and an input/output interface (none of which is shown). In accordance with detection signals from the sensors 21 to 26 described above, the ECU 2 performs various calculation processes for air-fuel ratio control and others, on the basis of control programs stored in the ROM. In the present embodiment, the ECU 2 corresponds to an output deviation converter, a control input calculator, and an air-fuel ratio controller.

An air-fuel ratio control process performed by the ECU 2 will now be described with reference to FIG. 3 to FIG. 7. The air-fuel ratio control process calculates the target air-fuel ratio KCMD such that the $O_2$ output value SVO2 is equal to a target value SVO2CMD, calculates the fuel injection quantity Tout such that the actual air-fuel ratio KACT is equal to the calculated target air-fuel ratio KCMD, and thus controls an air-fuel ratio of an air-fuel mixture burned in the engine 3 and the exhaust gas air-fuel ratio A/FEX. In the present embodiment, for reduction of NOx, the target value SVO2CMD is set to a relatively large value (e.g., 650 mV) which corresponds to a ratio slightly richer than the theoretical exhaust gas air-fuel ratio A/FEXTH to which a value SVO2TH (e.g., 590 mV) corresponds (see FIG. 2).

Figure 3:
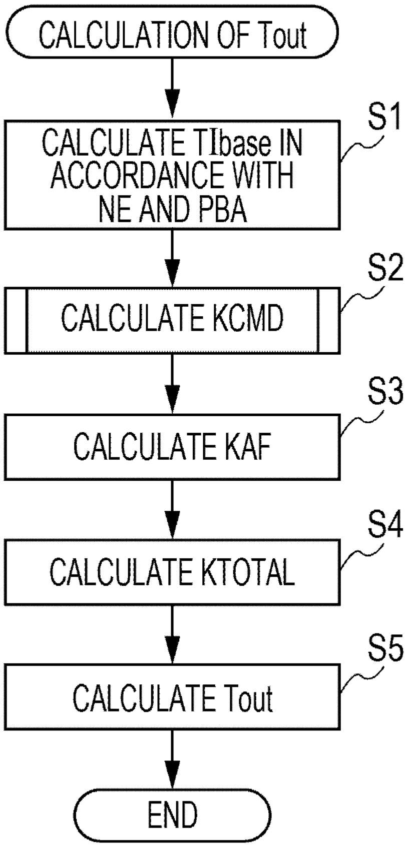
FIG. 3 is a flowchart illustrating a process of calculating a fuel injection quantity.

FIG. 3 illustrates a process of calculating the fuel injection quantity Tout. This process is executed in synchronization with generation of the TDC signal. In step S1, a basic fuel quantity TIbase is calculated by searching a predetermined map (not shown) in accordance with the engine speed NE and the intake pressure PBA. The basic fuel quantity TIbase is a basic value of the fuel injection quantity Tout. In this predetermined map, the basic fuel quantity TIbase is set such that the higher the engine speed NE and the intake pressure PBA, the larger the basic fuel quantity TIbase. The air mass GAIR detected by the airflow meter 23 may be used to calculate the basic fuel quantity TIbase. Next, the target air-fuel ratio KCMD is calculated in step S2, which will be described in detail below.

In step S3, through proportional-integral-derivative (PID) feedback control, an air-fuel ratio correction factor KAF is calculated such that the actual air-fuel ratio KACT detected by the LAF sensor 22 converges to the target air-fuel ratio KCMD. Alternatively, a self-tuning regulator (STR) may be used to calculate the air-fuel ratio correction factor KAF.

In step S4, a total correction factor KTOTAL is calculated. The total correction factor KTOTAL is calculated by multiplying various correction factors, including a water-temperature correction factor calculated in accordance with the engine water temperature TW.

In step S5, the fuel injection quantity Tout is calculated by the following equation (1) using the basic fuel quantity TIbase, the target air-fuel ratio KCMD, the air-fuel ratio correction factor KAF, and the total correction factor KTOTAL calculated in steps S1 to S4, and thus the process ends.

$$Tout = TIbase \cdot KCMD \cdot KAF \cdot KTOTAL \tag{1}$$

Figure 4:
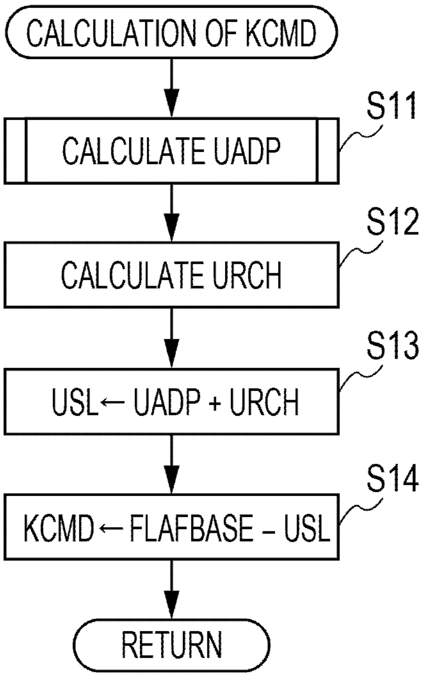
FIG. 4 is a flowchart illustrating a process of calculating a target air-fuel ratio.
Figure 5:
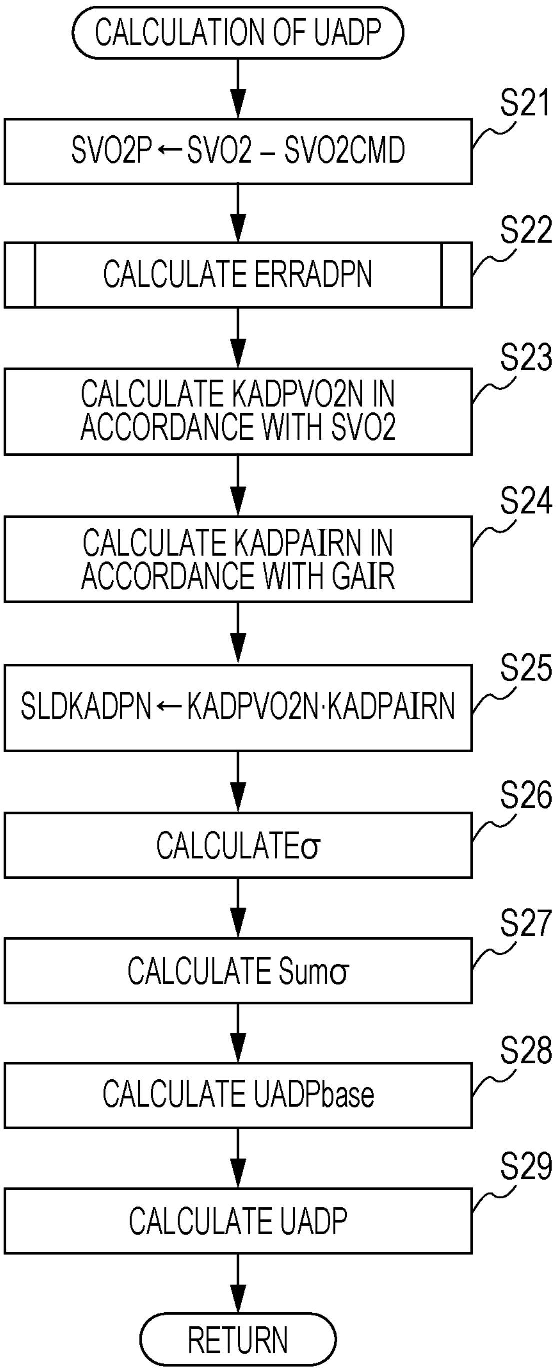
FIG. 5 is a flowchart illustrating a process of calculating an adaptive law input.

Next, the calculation of the target air-fuel ratio KCMD in step S2 of FIG. 3 will be described with reference to FIG. 4. This process involves calculating the target air-fuel ratio KCMD using sliding mode control algorithms represented by equations (3) to (8) described below. First, an adaptive law input UADP is calculated in step S11. FIG. 5 illustrates a subroutine of step S11 in FIG. 4.

Figure 6:
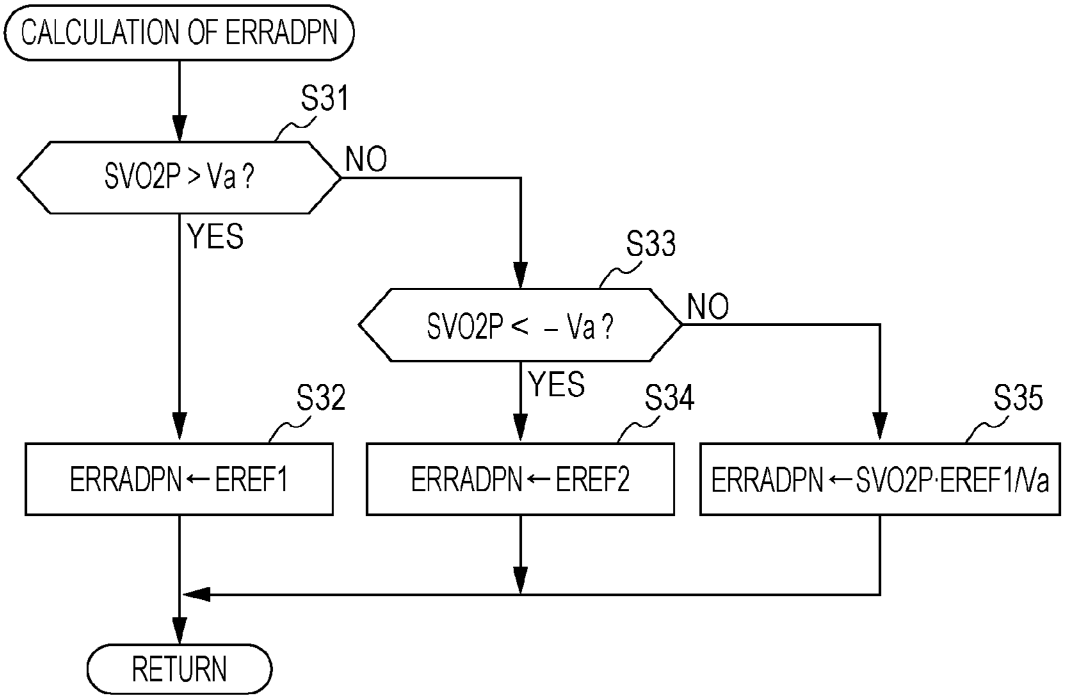
FIG. 6 is a flowchart illustrating a process of calculating a conversion value.
Figure 7:
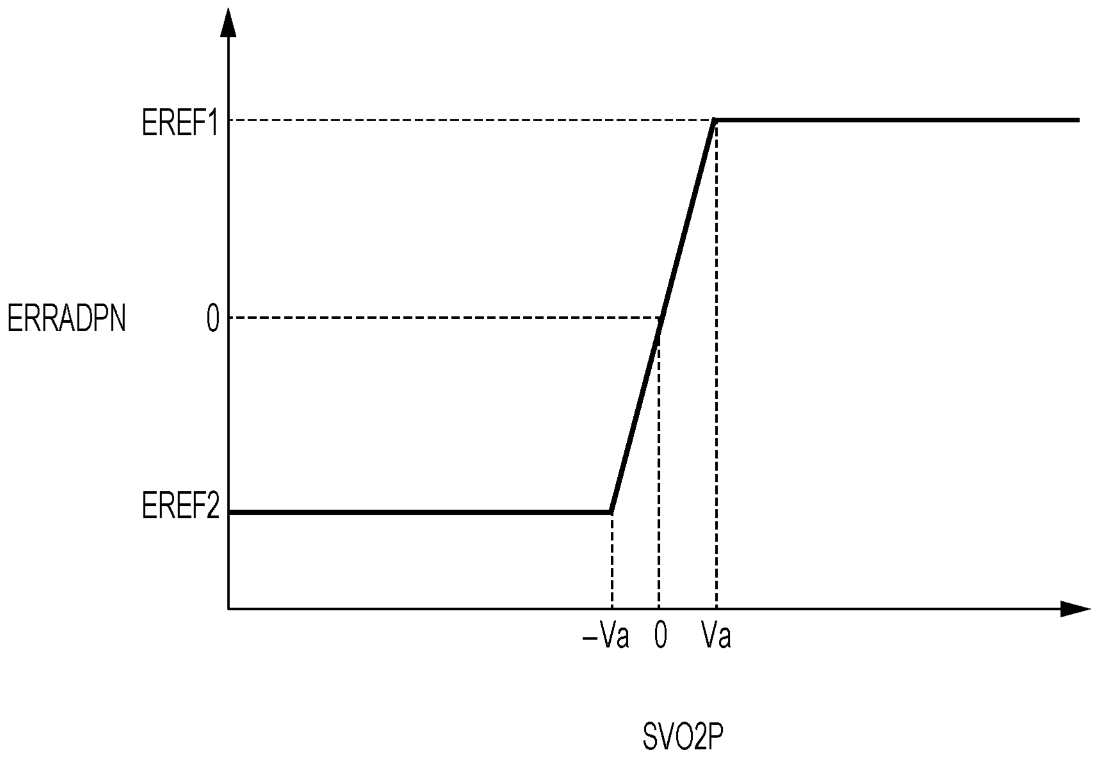
FIG. 7 is a graph for explaining a conversion value.

In step S21 of FIG. 5, a difference between the $O_2$ output value SVO2 and the target value SVO2CMD is calculated as an output deviation SVO2P. In step S22, a process of setting a conversion value ERRADPN is performed. FIG. 6 illustrates a subroutine of step S22 in FIG. 5.

In step S31 of FIG. 6, a determination is made as to whether the output deviation SVO2P is larger than a predetermined value Va (e.g., 30 mV). If the output deviation SVO2P is larger than the predetermined value Va (YES in step S31), the process proceeds to step S32, where a first predetermined value EREF1 which is a positive value (e.g., 1.0) is set as the conversion value ERRADPN. The process thus ends.

If the output deviation SVO2P is not larger than the predetermined value Va (NO in step S31), the process proceeds to step S33, where a determination is made as to whether the output deviation SVO2P is smaller than a −Va value. If the output deviation SVO2P is smaller than the −Va value (YES in step S33), the process proceeds to step S34, where a second predetermined value EREF2 which is equal in absolute value to the first predetermined value EREF1 and is a negative value (e.g., −1.0) is set as the conversion value ERRADPN. The process thus ends.

If the output deviation SVO2P is not larger than the predetermined value Va (NO in step S31), and if −Va SVO2P Va is satisfied (NO in step S33), the process proceeds to step S35, where the conversion value ERRADPN is calculated by the following equation (2) using the output deviation SVO2P, the first predetermined value EREF1, and the predetermined value Va. The process thus ends.

$$ERRADPN=SVO2P \cdot EREF1/Va \quad (2)$$

As described above, the conversion value ERRADPN is set to the first predetermined value EREF1 if the output deviation SVO2P is on the richer side outside a predetermined range defined by the −Va value and the Va value, and is set to the second predetermined value EREF2 (=−EREF1) if the output deviation SVO2P is on the leaner side outside the predetermined range. If the output deviation SVO2P is within the predetermined range, the conversion value ERRADPN is calculated by interpolation based on the first predetermined value EREF1 and the second predetermined value EREF2 (see FIG. 7).

Referring back to FIG. 5, in step S23 following step S22, a first gain KADPVO2N is calculated by searching the predetermined map (not shown) in accordance with the $O_2$ output value SVO2.

In step S24, a second gain KADPAIRN is calculated by searching the predetermined map (not shown) in accordance with the air mass GAIR. In step S25, a total gain SLDKADPN is calculated by multiplying the first gain KADPVO2N by the calculated second gain KADPAIRN.

In step S26, a switching function σ(k) is calculated by the following equation (3) using the conversion value ERRADPN(k), the conversion value ERRADPN(k−1) for the previous time, and a predetermined response-specifying parameter s (−1<s<0).

$$\sigma(k)=ERRADPN(k)+s \cdot ERRADPN(k-1) \quad (3)$$

In step S27, an integral Sumσ(k) of the switching function σ(k) is calculated by the following equation (4).

$$\mathrm{Sum}\sigma(k)=\mathrm{Sum}\sigma(k-1)+SLDKADPN \cdot \sigma(k) \quad (4)$$

In step S28, a basic adaptive law input UADPbase is calculated by the following equation (5) using the calculated integral Sumσ(k) and the total gain SLDKADPN.

$$\begin{aligned} UADPbase &= UADPbase(k-1) + SLDKADPN \cdot \sigma(k) \\ &= \mathrm{Sum}\sigma(k) \end{aligned} \quad (5)$$

In step S29, the adaptive law input UADP is calculated by applying limit processing to the calculated basic adaptive law input UADPbase, and then the process ends. Specifically, in the limit processing, the adaptive law input UADP is set to a predetermined upper limit UADPLMTH if the basic adaptive law input UADPbase is larger than the upper limit UADPLMTH, set to a lower limit UADPLMTL if the basic adaptive law input UADPbase is smaller than the lower limit UADPLMTL, and otherwise set to the basic adaptive law input UADPbase.

Referring back to FIG. 4, in step S12 following step S11, a basic reaching law input URCHbase is calculated by the following equation (6) using a predetermined reaching law gain KRCH and the switching function σ(k), and then a value obtained by applying limit processing to the calculated basic reaching law input URCHbase is calculated as an ultimate reaching law input URCH.

$$URCH=KRCH \cdot \sigma(k) \quad (6)$$

In step S13, a correction value USL is calculated by the following equation (7) using the calculated adaptive law input UADP and the reaching law input URCH.

$$USL=UADP+URCH \quad (7)$$

In step S14, the target air-fuel ratio KCMD is calculated by the following equation (8) using a predetermined reference air-fuel ratio FLAFBASE and the calculated correction value USL, and thus the process ends.

$$KCMD=FLAFBASE-USL \quad (8)$$

As described above, in the present embodiment, the output deviation SVO2P of the $O_2$ sensor 21 is converted to the first predetermined value EREF1 if the $O_2$ output value SVO2 is on the richer side of the target value SVO2CMD, and converted to the second predetermined value EREF2 (=−EREF1) if the $O_2$ output value SVO2 is on the leaner side of the target value SVO2CMD. Through this conversion, as in the present embodiment where the target value SVO2CMD is set to be on the richer side of the value corresponding to the theoretical exhaust gas air-fuel ratio A/FEXTH, even when the output characteristic of the $O_2$ sensor 21 is asymmetric, the conversion value ERRADPN is symmetric with respect to the target value SVO2CMD.

Then, in such a manner that the converted output deviation SVO2P is zero, the target air-fuel ratio KCMD for feedback-controlling the $O_2$ output value SVO2 is calculated and used to control the exhaust gas air-fuel ratio A/FEX. Therefore, even when the output characteristic of the $O_2$ sensor 21 is asymmetric with respect to the target value SVO2CMD, it is possible to properly calculate the target air-fuel ratio KCMD while properly compensating for the asymmetry. It is thus possible to improve accuracy in controlling the exhaust gas air-fuel ratio A/FEX.

If the output deviation SVO2P is within the predetermined range defined by the −Va value and the Va value, the conversion value ERRADPN is calculated by interpolation using the equation (2) described above. Therefore, when the output deviation SVO2P is within the predetermined range, it is possible to precisely and properly calculate the conversion value ERRADPN in accordance with the output deviation SVO2P while maintaining the linearity of the conversion value ERRADPN. Within the predetermined range, the conversion value ERRADPN continuously changes between the first predetermined value EREF1 and the second predetermined value EREF2. It is thus possible to avoid abrupt changes in the conversion value ERRADPN and prevent variations in the target air-fuel ratio KCMD.

Also, when the conversion value ERRADPN properly calculated as described above is used to calculate the adaptive law input UADP, it is possible to prevent a rich shift of the adaptive law input UADP. Additionally, since the conversion value ERRADPN is not used to calculate the reaching law input URCH, it is possible to ensure responsivity of feedback.

The target air-fuel ratio KCMD is calculated by sliding mode control such that the $O_2$ output value SVO2 is equal to the target value SVO2CMD. Thus, by using the exhaust gas air-fuel ratio A/FEX detected by the $O_2$ sensor 21, the target air-fuel ratio KCMD can be properly calculated by sliding mode control which is less sensitive to disturbance and allows quick convergence to a target value. Moreover, since the target air-fuel ratio KCMD calculated as described above is used to control the fuel injection quantity Tout such that the actual air-fuel ratio KACT detected by the LAF sensor 22 is equal to the target air-fuel ratio KCMD, it is possible to further improve accuracy in controlling the air-fuel ratio of an air-fuel mixture and the exhaust gas air-fuel ratio A/FEX.

The present invention is not limited to the embodiments described above, and can be carried out in various modes. For example, although the target air-fuel ratio KCMD is calculated by sliding mode control in the embodiments described above, it may be calculated by PID feedback control. In the latter case, an integral term is calculated using the conversion value ERRADPN. A proportional term or a derivative term may be calculated using the conversion value ERRADPN.

In the embodiments described above, if the output deviation SVO2P is within a predetermined range, the conversion value ERRADPN is set to a value calculated by interpolation. Alternatively, when the output deviation SVO2P is within a predetermined range, the conversion value ERRADPN may be set to a value on the line that linearly connects the first predetermined value EREF1 and the second predetermined value EREF2.

In the embodiments described above, the first predetermined value EREF1 and the second predetermined value EREF2, each serving as the conversion value ERRADPN for converting the output deviation SVO2P, are set to 1.0 and −1.0, respectively. However, the first predetermined value EREF1 and the second predetermined value EREF2 may be set to any values that have the same absolute value and opposite signs.

Although the embodiment of the present invention is applied to a gasoline engine mounted on a vehicle in the embodiments described above, the embodiment of the present invention may be applied to various other engines, such as diesel engines. The present invention is applicable to engines which are not for vehicles. For example, the present invention is applicable to a ship propulsion engine, such as an outboard engine in which a crankshaft is disposed vertically. Structural details of the present invention may be changed as necessary within the scope of the present invention.

According to the embodiment of the present invention, an air-fuel ratio control apparatus 1 for an internal combustion engine 3 includes an air-fuel ratio sensor (oxygen concentration sensor 21) disposed in an exhaust path (exhaust pipe 5) of the internal combustion engine 3, configured to detect an air-fuel ratio of exhaust gas, and having an output characteristic which is nonlinear with respect to the air-fuel ratio of exhaust gas; an output deviation converter (ECU 2, see FIG. 6) configured to convert an output deviation SVO2P to a first predetermined value EREF1 if an output value ($O_2$ output value SVO2) of the air-fuel ratio sensor is on the richer side of a predetermined target value SVO2CMD and to a second predetermined value EREF2 if the output value is on the leaner side of the target value SVO2CMD, the output deviation SVO2P being a difference between the output value and the target value SVO2CMD, the first and second predetermined values EREF1 and EREF2 having the same absolute value and opposite signs; a control input calculator (ECU 2, see FIG. 4) configured to calculate a control input for feedback-controlling the output value of the air-fuel ratio sensor such that the converted output deviation SVO2P is zero; and an air-fuel ratio controller (ECU 2) configured to control the air-fuel ratio of exhaust gas using the calculated control input.

The internal combustion engine has the air-fuel ratio sensor that detects an air-fuel ratio of exhaust gas. Here, the term “air-fuel ratio of exhaust gas” refers to the weight ratio between air and combustible gas in exhaust gas. The air-fuel ratio sensor is of type having an output characteristic which is nonlinear with respect to the air-fuel ratio of exhaust gas. Therefore, if a target value is set to a value different from a value according to a theoretical air-fuel ratio, the output characteristic of the air-fuel ratio sensor is asymmetric between the richer and leaner sides of the target value. In the embodiment of the present invention, the output deviation, which is a difference between the output value of the air-fuel ratio sensor and the target value, is converted to the first predetermined value if the output value is on the richer side of the target value and to the second predetermined value if the output value is on the leaner side of the target value. The first and second predetermined values have the same absolute value and opposite signs. Through the conversion described above, even when the output characteristic of the air-fuel ratio sensor is asymmetric with respect to the target value, the converted output deviation becomes symmetric with respect to the target value.

Then, in such a manner that the converted output characteristic becomes zero, a control input for feedback-controlling the output value of the air-fuel ratio sensor is calculated and used to control the air-fuel ratio of exhaust gas. Therefore, even when the output characteristic of the air-fuel ratio sensor is asymmetric with respect to the target value, it is possible to properly calculate the control input used in the feedback control based on the output value of the air-fuel ratio sensor and the target value while properly compensating for the asymmetry. It is thus possible to improve accuracy in controlling the air-fuel ratio.

According to the embodiment of the present invention, in the air-fuel ratio control apparatus 1, the output deviation converter may convert the output deviation SVO2P to the first predetermined value EREF1 (step S32 in FIG. 6) if the output deviation SVO2P is on the richer side outside a predetermined range (SVO2P>Va), to the second predetermined value EREF2 (step S34 in FIG. 6) if the output deviation SVO2P is on the leaner side outside the predetermined range (SVO2P<−Va), and to a value calculated by interpolation based on the first and second predetermined values EREF1 and EREF2 (step S35 in FIG. 6, see FIG. 7) if the output deviation SVO2P is within the predetermined range, the predetermined range being defined symmetrically with respect to a value of zero.

In this configuration, the predetermined range is defined symmetrically with respect to a value of zero. If the output deviation is on the richer or leaner side outside the predetermined range, the output deviation is converted to the first or second predetermined value. If the output deviation is within the predetermined range, the output deviation is converted to a value calculated by interpolation based on the first and second predetermined values. Thus, even within the predetermined range around the target value, it is possible to precisely convert the output deviation while maintaining its linearity. Within the predetermined range, the converted output deviation changes continuously between the first predetermined value and the second predetermined value. It is thus possible to avoid abrupt changes in control input in the vicinity of the target value.

According to the embodiment of the present invention, in the air-fuel ratio control apparatus 1, the control input may include an integral term, and the control input calculator may use the converted output deviation to calculate the integral term (step S26 in FIG. 5).

In this configuration, the converted output deviation is used to calculate the integral term included in the control input. Since the integral term is calculated by cumulative addition, the accuracy of the output deviation has an impact greater than that of other feedback components. Therefore, when the output deviation properly calculated as described above is used to calculate the integral term, an improper shift of the integral term can be avoided. Since feedback components other than the integral term are not calculated in a cumulative manner, the nonlinearity of the output characteristic of the air-fuel ratio sensor has a smaller impact. Therefore, by not using the output deviation for these feedback components, it is possible to ensure responsivity of feedback.

According to the embodiment of the present invention, in the air-fuel ratio control apparatus 1, the air-fuel ratio sensor may be disposed downstream of a catalyst 8 for cleaning up exhaust gas discharged from the internal combustion engine 3. The air-fuel ratio control apparatus 1 may further include an upstream air-fuel ratio sensor (LAF sensor 22) disposed upstream of the catalyst 8, configured to detect an air-fuel ratio of exhaust gas, and having an output characteristic that changes linearly in accordance with the air-fuel ratio of exhaust gas. The air-fuel ratio controller may calculate a target air-fuel ratio KCMD as the control input by means of sliding mode control such that the output value of the air-fuel ratio sensor is equal to the target value SVO2CMD, and may control the amount of fuel supplied to the internal combustion engine 3 (fuel injection quantity Tout) such that the air-fuel ratio of exhaust gas detected by the upstream air-fuel ratio sensor is equal to the target air-fuel ratio. The control input may include an adaptive law input UADP calculated using the converted output deviation.

In this configuration, the air-fuel ratio sensor is disposed downstream of the catalyst, and the upstream air-fuel ratio sensor having an output characteristic that changes linearly in accordance with the air-fuel ratio of exhaust gas is disposed upstream of the catalyst. The target air-fuel ratio serving as a control input is calculated by sliding mode control such that the output value of the air-fuel ratio sensor is equal to the target value. Thus, by using the air-fuel ratio of exhaust gas detected by the air-fuel ratio sensor, the target air-fuel ratio can be properly calculated by sliding mode control which is less sensitive to disturbance and allows quick convergence to a target value.

Then, the target air-fuel ratio calculated as described above is used to control the amount of fuel supplied to the internal combustion engine such that the air-fuel ratio of exhaust gas detected by the upstream air-fuel ratio sensor is equal to the target air-fuel ratio. Therefore, it is possible to further improve accuracy in controlling the air-fuel ratio. The control input includes an adaptive law input in sliding mode control. The adaptive law input corresponds to the integral term and is calculated using the converted output deviation. Therefore, the advantage can be achieved in which the converted output deviation is used to calculate the integral term.

Obviously, numerous modifications and variations of the present invention are possible in light of the above teachings. It is therefore to be understood that within the scope of the appended claims, the invention may be practiced otherwise than as specifically described herein.

What is claimed is:

1. An air-fuel ratio control apparatus for an internal combustion engine, the apparatus comprising:

an air-fuel ratio sensor disposed in an exhaust path of the internal combustion engine and configured to detect an air-fuel ratio of exhaust gas, the air-fuel ratio sensor having an output characteristic which is nonlinear with respect to the air-fuel ratio of exhaust gas;

an output deviation converter configured to convert an output deviation to a first predetermined value if an output value of the air-fuel ratio sensor is on a richer side of a predetermined target value and to a second predetermined value if the output value is on a leaner side of the target value, the output deviation being a difference between the output value and the target value, the first and second predetermined values having a same absolute value and opposite signs;

a control input calculator configured to calculate a control input to feedback-control the output value of the air-fuel ratio sensor such that the output deviation converted by the output deviation converter is to be zero; and an air-fuel ratio controller configured to control the air-fuel ratio of exhaust gas using the control input calculated by the control input calculator.

2. The air-fuel ratio control apparatus according to claim 1, wherein the output deviation converter is configured to convert the output deviation to the first predetermined value if the output deviation is on the richer side outside a predetermined range, to the second predetermined value if the output deviation is on the leaner side outside the predetermined range, and to a value calculated by interpolation based on the first and second predetermined values if the output deviation is within the predetermined range, the predetermined range being defined symmetrically with respect to a value of zero.

3. The air-fuel ratio control apparatus according to claim 2, wherein the control input includes an integral term, and the control input calculator is so constructed to use the output deviation to calculate the integral term.

4. The air-fuel ratio control apparatus according to claim 3, wherein the air-fuel ratio sensor is disposed downstream of a catalyst to clean up exhaust gas discharged from the internal combustion engine, wherein the air-fuel ratio control apparatus further comprises an upstream air-fuel ratio sensor disposed upstream of the catalyst and configured to detect an air-fuel ratio of exhaust gas, the upstream air-fuel ratio sensor having an output characteristic that changes linearly in accordance with the air-fuel ratio of exhaust gas, wherein the air-fuel ratio controller is configured to calculate a target air-fuel ratio as the control input using sliding mode control such that the output value of the air-fuel ratio sensor is equal to the target value, and is configured to control an amount of fuel supplied to the internal combustion engine such that the air-fuel ratio of exhaust gas detected by the upstream air-fuel ratio sensor is equal to the target air-fuel ratio, and wherein the control input includes an adaptive law input calculated using the output deviation converted by the output deviation converter.

5. The air-fuel ratio control apparatus according to claim 2, wherein the air-fuel ratio sensor is disposed downstream of a catalyst to clean up exhaust gas discharged from the internal combustion engine, wherein the air-fuel ratio control apparatus further comprises an upstream air-fuel ratio sensor disposed upstream of the catalyst and configured to detect an air-fuel ratio of exhaust gas, the upstream air-fuel ratio sensor having an output characteristic that changes linearly in accordance with the air-fuel ratio of exhaust gas, wherein the air-fuel ratio controller is configured to calculate a target air-fuel ratio as the control input using sliding mode control such that the output value of the air-fuel ratio sensor is equal to the target value, and is configured to control an amount of fuel supplied to the internal combustion engine such that the air-fuel ratio of exhaust gas detected by the upstream air-fuel ratio sensor is equal to the target air-fuel ratio, and wherein the control input includes an adaptive law input calculated using the output deviation converted by the output deviation converter.

6. The air-fuel ratio control apparatus according to claim 1, wherein the control input includes an integral term, and the control input calculator is so constructed to use the output deviation converted by the output deviation converter to calculate the integral term.

7. The air-fuel ratio control apparatus according to claim 6, wherein the air-fuel ratio sensor is disposed downstream of a catalyst to clean up exhaust gas discharged from the internal combustion engine, wherein the air-fuel ratio control apparatus further comprises an upstream air-fuel ratio sensor disposed upstream of the catalyst and configured to detect an air-fuel ratio of exhaust gas, the upstream air-fuel ratio sensor having an output characteristic that changes linearly in accordance with the air-fuel ratio of exhaust gas, wherein the air-fuel ratio controller is configured to calculate a target air-fuel ratio as the control input using sliding mode control such that the output value of the air-fuel ratio sensor is equal to the target value, and is configured to control an amount of fuel supplied to the internal combustion engine such that the air-fuel ratio of exhaust gas detected by the upstream air-fuel ratio sensor is equal to the target air-fuel ratio, and wherein the control input includes an adaptive law input calculated using the output deviation converted by the output deviation converter.

8. The air-fuel ratio control apparatus according to claim 1, wherein the air-fuel ratio sensor is disposed downstream of a catalyst to clean up exhaust gas discharged from the internal combustion engine, wherein the air-fuel ratio control apparatus further comprises an upstream air-fuel ratio sensor disposed upstream of the catalyst and configured to detect an air-fuel ratio of exhaust gas, the upstream air-fuel ratio sensor having an output characteristic that changes linearly in accordance with the air-fuel ratio of exhaust gas, wherein the air-fuel ratio controller is configured to calculate a target air-fuel ratio as the control input using sliding mode control such that the output value of the air-fuel ratio sensor is equal to the target value, and is configured to control an amount of fuel supplied to the internal combustion engine such that the air-fuel ratio of exhaust gas detected by the upstream air-fuel ratio sensor is equal to the target air-fuel ratio, and wherein the control input includes an adaptive law input calculated using the output deviation converted by the output deviation converter.

9. An air-fuel ratio control apparatus for an internal combustion engine, the apparatus comprising:

an air-fuel ratio sensing means for detecting an air-fuel ratio of exhaust gas, the air-fuel ratio sensing means being disposed in an exhaust path of the internal combustion engine and having an output characteristic which is nonlinear with respect to the air-fuel ratio of exhaust gas;

an output deviation converting means for converting an output deviation to a first predetermined value if an output value of the air-fuel ratio sensing means is on a richer side of a predetermined target value and to a second predetermined value if the output value is on a leaner side of the target value, the output deviation being a difference between the output value and the target value, the first and second predetermined values having a same absolute value and opposite signs;

a control input calculating means for calculating a control input to feedback-control the output value of the air-fuel ratio sensing means such that the output deviation converted by the output deviation converting means is to be zero; and an air-fuel ratio controlling means for controlling the air-fuel ratio of exhaust gas using the control input calculated by the control input calculating means.

* * * * *